United States Patent
Sulzer et al.

(10) Patent No.: US 9,944,799 B2
(45) Date of Patent: Apr. 17, 2018

(54) COLOR AND METHOD FOR RENOVATING AN OPEN-PORED LAYER OF PLASTER

(71) Applicant: BASWA acoustic AG, Baldegg (CH)

(72) Inventors: Eric Sulzer, Zurich (CH); Bernhard Hanisch, Frick (DE); Edgar Fructuoso, Alicante (ES)

(73) Assignee: BASWA ACOUSTIC AG, Baldegg (CH)

( * ) Notice: Subject to any disclaimer, the term of this patent is extended or adjusted under 35 U.S.C. 154(b) by 257 days.

(21) Appl. No.: 14/638,780

(22) Filed: Mar. 4, 2015

(65) Prior Publication Data

US 2015/0252198 A1 Sep. 10, 2015

(30) Foreign Application Priority Data

Mar. 6, 2014 (EP) ................................. 14158082

(51) Int. Cl.
| | |
|---|---|
| *C09D 1/02* | (2006.01) |
| *C04B 28/26* | (2006.01) |
| *C04B 14/04* | (2006.01) |
| *B05B 9/04* | (2006.01) |

(52) U.S. Cl.
CPC ............... *C09D 1/02* (2013.01); *B05B 9/04* (2013.01); *C04B 14/042* (2013.01); *C04B 28/26* (2013.01)

(58) Field of Classification Search
CPC ......... B05B 9/04; C04B 14/042; C04B 28/26; C09D 1/02
See application file for complete search history.

(56) References Cited

U.S. PATENT DOCUMENTS

| | | |
|---|---|---|
| 5,238,881 A | 8/1993 | Norris |
| 2008/0011195 A1 | 1/2008 | Grochal et al. |

FOREIGN PATENT DOCUMENTS

| | | |
|---|---|---|
| DE | 2652421 A1 | 5/1977 |
| DE | 19614296 A1 | 10/1996 |
| EP | 0368507 A2 | 5/1990 |
| EP | 1484294 A2 | 12/2004 |
| WO | WO-0200350 A1 | 1/2002 |
| WO | WO-2005118726 A1 | 12/2005 |

OTHER PUBLICATIONS

Vanderbilt Minerals, LLC. "VEEGUM® Magnesium Aluminum Silicate VANATURAL® Bentonite Clay for Personal Care and Pharmaceuticals." 2016.*
Basf Corporation, "Attagel Rheology 1-12 modifiers Helping Make Products Better", Technical Bochure, Dec. 31, 2007, 12 Pages.
Basf Corporation, "Attapulgite Colloidal 1-12 Hydrated Magnesium Alumino-Silicate General Product Description", Dec. 31, 2007, 6 Pages.
Biofa Naturprodukte, "Technisches Merkblatt BIOFA Solimin Silikatfarbe 3051", Mar. 17, 2003, 2 Pages.
W. L. Haden et al., "Attapulgite: 1-13 Properties and Uses", Clays and Clay Materials, Jan. 2, 1961. pp. 284-290.
European Search Report for EP 14158082 dated Sep. 8, 2014.

* cited by examiner

*Primary Examiner* — Jessee Roe
*Assistant Examiner* — Alexander Polyansky
(74) *Attorney, Agent, or Firm* — Harness, Dickey and Pierce, P.L.C.

(57) ABSTRACT

For renovating an open-pored plaster layer, a paint is made available that includes water, an inorganic binder on an alkali polysilicate base, a pigment composed of particles and a stabilizer. The stabilizer is composed of small particles on a silicate base, having an average diameter below 3 μm, wherein these particles are colloidal distributed in water because of their charge distribution. As a result, the stabilizer prevents an insoluble sedimenting of the pigment particles. Following the application of this paint, the desired and in particular the original color shade is again uniformly present across the complete surface, and the cohesive pores extending through the plaster layer are essentially still open. The sound-absorbing effect of the porous plaster layer is therefore not substantially impaired as a result of the renovation.

20 Claims, No Drawings

COLOR AND METHOD FOR RENOVATING AN OPEN-PORED LAYER OF PLASTER

PRIORITY STATEMENT

The present application hereby claims priority under 35 U.S.C. § 119 to European patent application number EP14158082 filed Mar. 6, 2014, the entire contents of which are hereby incorporated herein by reference.

FIELD

At least one embodiment of the invention generally relates to a paint and to a method of applying the paint.

BACKGROUND

Plaster layers are frequently applied to walls and in particular to the ceilings of rooms. Where applicable, the plaster material is applied directly to the unfinished walls and ceilings. In the case of walls and ceilings covered with panels, it is useful to apply a layer of plaster to the panels in order to form a continuous, level inside surface. The panels used have different compositions, depending on their function. For example, there are pre-coated fiber panels with a layer of plaster that is facing the room inside. Following the mounting of the panels, the joints between the panels are filled and a thin layer of plaster is applied to even out the area. However, the plaster layer can also be composed of two or more layers, wherein each plaster layer consists of at least one plaster compound with a main grain share. A system composed of a plaster layer on fiber panels achieves a sound-absorbing effect over a large frequency range, provided that open and/or continuous pores extend over the total layer thickness of the plaster layer, meaning from the surface layer facing the room to the region where the plaster layer adheres to the fiber panel.

The DE 196 14 296 C2 describes a plaster compound having relatively large intermediate spaces and/or pores as a result of grains that are for the most part similarly large and are positioned adjacent to each other in the plaster layer. The hardened plaster layer contains pores which ensure a good sound absorption and thus also a good thermal insulation. To prevent clogging of the pores, the grainy portion is composed of a large share of the main grains and a small share of the fine grains. In addition, using a small amount of binder prevents the pores from being clogged with binder, especially with binder membranes. A small amount of synthetic resin dispersion binder together with a small amount of thickening agent is used, so that the use of even a small amount of the binder will make it possible to achieve the flow characteristics required for a stable joining of the tightly packed main grain share. In the dried out state, the binder and the fine-grain share jointly form minimum bridges between these grains of the main grain share at the contact locations. The porosity of the plaster layer is in the range of 20 to 50 percent by volume and ensures low flow resistances throughout the plaster layer (80-240 rayls). A marble grain with narrow grain distribution in the range of 0.1 to 0.5 mm can form the main grain share. When using this grain size for the grain main grain share, it is possible to achieve an extremely smooth surface which resembles a gypsum surface. The cohesive and/or open pores have diameters somewhat smaller than the average grain size of the main grain share. A bright surface color is achieved for the hardened plaster layer by using a white marble grain.

With a plaster layer arranged on a fiber panel, the pores extending through the plaster layer guarantee a sound absorption over the complete, audible frequency range. Experiments have shown that a sound dissipation is achieved within the pores of the plaster layer and in the fiber panel, wherein the amount of attenuation in the two layers preferably varies for different frequency ranges. In addition, the membrane-type vibrating capacity of the plaster layer on the fiber panel also results in a clear deep-tone absorption.

The EP 1 484 294 B1 describes coated building panels where the panel element is a fiber mat or fiber panel and the plaster layer comprises porous particles, a silica binder, an organic polymer and xanthan as the thickening agent, wherein the porous particles have diameters ranging from 0.1 to 3 mm, preferably from 0.5 to 1 mm. An embodiment is described for which in addition to the cavities in the porous particles, cohesive and/or open pores with diameters somewhat smaller than the particle diameters are formed between the particles, thereby ensuring a strong sound absorption. To achieve a white surface, porous particles of tobermorite are preferably used (for example Circosil). Following the installation of the coated panels, a plaster compound as described in the DE 196 14 296 C2 can be applied as the cover layer, wherein the pores on the surface have somewhat smaller cross sections, corresponding to the grain size of the cover layer, than in the region of the layer underneath which contains somewhat larger porous particles.

Dirt emanating from the users of the rooms can reach the surface of the open-pore plaster layers according to the DE 196 14 296 C2 or the EP 1 484 294 B1 and/or the dirt particles carried along by the air can result in dirtying the surface. The dirt covers at least partial regions of the grains in the plaster surface. With dirty grains, the bright color is no longer visible, thereby leading to an impaired total impression of the plaster surface. Cleaning with a cleaning solution is not very promising because of the porosity since the cleaning liquid and therein absorbed dirt particles can enter the plaster layer through the pores. A dry rubbing off or grinding down of the particle layer would result in visible unevenness of the surface and to clogging of the pores with the ground-off material. Removing the dirty plaster layers and applying new plaster layers is very expensive and involved. If the open-pored plaster layers are coated with a standard paint coat, the pore surfaces are closed off and the sound-absorbing characteristic of the plaster layer and/or the composition of the fiber panel and plaster layer are essentially lost.

SUMMARY

At least one embodiment of the invention is directed to a paint and a method for renovating open-pored plaster layers, so that the desired and in particular the original color is again uniformly present across the total surface and so that the cohesive pores extending through the plaster layer remain substantially open. The sound absorbing effect should furthermore not be worsened substantially as a result of the renovation.

In at least one embodiment, a paint and/or a method are disclosed. The dependent claims describe alternative or advantageous embodiment variants which solve additional problems.

In at least one embodiment, a paint comprises: water; an inorganic binder on an alkali polysilicate base; a pigment composed of particles; and a stabilizer, to prevent an insoluble sedimenting of the pigment particles, composed of relatively small stabilizer particles on a silicate base with an average maximum expansion below 3 µm, the stabilizer particles being distributed colloidal in the water.

In at least one embodiment, a method, for renovating an open-pored plaster layer, comprises applying the paint with an airless spraying technique under high pressure.

DETAILED DESCRIPTION OF THE EXAMPLE EMBODIMENTS

During a first inventive step, it was discovered that paints with a high share of synthetic resin binder cannot be used because these clog the pores of the plaster layer with membranes of the synthetic resin binder. The renovation paint according to at least one embodiment of the invention comprises an inorganic binder which can furthermore be added at a high share, without forming membranes that could clog the plaster layer pores during the application and setting process. The renovation paint should advantageously be usable on plaster layers with synthetic resin binders as well as on layers with mineral binders. This can be ensured if the binder contains at least a share of an inorganic binder on an alkali polysilicate base. Alkali polysilicates are crystalline solutions or glass-type (amorphous) solids, composed of a mixture of different silicates, and/or solutions that are viscous in water. They comprise at least one of the alkali metals such as lithium, sodium, potassium, rubidium, cesium or francium, wherein alkali polysilicates with sodium and potassium in the form of water glass are most widespread. In the pure form, alkali polysilicates are colorless. When applying a renovation paint containing this binder, the synthetic resin bridges of the plaster layer remain unchanged, and thus also the stability of a plaster layer with minimum shares of synthetic resin binder.

The silicate coatings presently found in the marketplace can be subdivided into silicate paints and dispersion silicate paints. In addition to alkali polysilicates and/or water glass, dispersion silicate paints also contain an organic binder, normally a synthetic resin dispersion. For that reason, dispersion silicate paints are also referred to as organosilicate paints. According to DIN 18363, dispersion silicate paints can only contain a maximum 5% by weight of organic components. An even smaller share or no synthetic resin dispersion at all is advantageously used, however, because this prevents a membrane forming and closing of the pores in the porous plaster layer.

Standard silicate paints according to DIN 18363 are composed of potassium water glass and pigments. Silicate paints cannot contain organic components, e.g. synthetic resin dispersions. Silicate paints are two-component products that are composed of liquid water glass (binder) and a powdery pigment filler compound. These components are mixed together just prior to the use because the pigment particles would otherwise sediment out during longer storage times and solidify while adhering to each other, so that the paint could no longer be used. A two-component solution is not suitable for the preferred renovation paint because the expenditure for mixing the components together just prior to the application is too high and the product accuracy which can thus be achieved is too low. A silicate paint must therefore be found which can be stored in the ready-to-use state.

The DE 26 52 421 A1 describes a binder on an alkali polysilicate base which is composed of a mixture of sodium silicate or potassium silicate and lithium silicate. Even a small amount of lithium silicate increases the waterproof quality in the set or cured state and ensures a somewhat lower PH value. In addition, efflorescences which appear during the setting of sodium waterglass can be avoided with the aid of the lithium silicate share. A renovation paint with a share of lithium silicate ensures a uniform color appearance following the setting.

Besides alkali polysilicates, the formulation of a renovation paint also includes pigments, filler materials, different types of additives and a stabilizer. The additional components must be selected to ensure that the pores of the plaster layer will not be clogged.

The pigments must be selected such that they also do not clog the pores of the porous plaster layer, but are only applied in the form of small amounts to coat the grains of the main grain share which are arranged on the surface of the plaster layer. This can be ensured by selecting the size of the pigments to be considerably smaller than the size of the grains in the main grain share of the plaster layer. The main share of the pigment particles must be smaller by at least the factor of 10, preferably at least the factor of 50, and essentially the factor of 100, than the average grain size in the main grain share of the plaster layer, wherein these grains measure essentially 0.3 mm resp. 300 µm with standard plaster layers. The average pigment size is thus smaller than 0.03 mm resp. 30 µm, preferably smaller than 0.006 mm or 6 µm, in particular essentially 0.001 to 0.003 mm resp. 1 to 3 µm, wherein it is advantageous to use a pigment with narrow grain-size distribution.

In addition to the correct size, the pigments should also have the desired color. The widely used porous plaster layers have a bright or white color stemming from the main grain share. The preferred pigments have a similarly bright or white color. Owing to the fact that the color visible to the naked eye after the renovation is understood to be composed of many small partial surfaces which the naked eye cannot resolve, it is possible to achieve on the whole the original color shade of the main grain share with a slightly brighter pigment in the combination, at the locations which are somewhat darkened by dirt on the grains of the main grain share.

The preferred pigments are inorganic particles since these interact optimally with the alkali polysilicate in the binder, in particular they do not impair the setting. It is understood that with plaster layers where the color of the grains of the main grain share deviates from the color white, correspondingly colored pigment particles can be used. The pigment can be made available as a fine grain of the same material as the main grain in the plaster layer, for example as a fine-grain share of the marble grain, meaning a carbonate rock. However, silicates could also be used, for example a pulverized phyllosilicate, such as the mineral talcum (steatite, magnesium silicate hydrate with a chemical composition of $Mg_3[Si_4O_{10}(OH)_2]$). A white pigment of titanium dioxide can also be added for an especially white appearance.

An easily available pigment with a narrow grain size spectrum near the desired grain size and with a desired brightness essentially consists of natural, fine micro-crystalline $CaCO_3$, for example available under the product name of IOKAL TYPE 5C with an average grain size of essentially 0.002 mm resp. 2 µm and a narrow grain-width spectrum. In particular, this pigment ensures that 99.99 weight percentages of the grains have a maximum diameter of less than 0.04 mm resp. 40 µm. 90 weight percentages of the pigment particles are smaller than 0.005 mm resp. 5 µm. These small pigment particles are deposited on the surfaces of the grains in the porous plaster layer and cannot clog the considerably larger pores.

In addition to the pigments and the binder with alkali polysilicates, a stabilizer and/or an emulsifying agent are used for formulating a renovation paint and, if applicable, in particular also additives with specific effects. The selection of the stabilizer must be matched to the special properties of the selected binder with alkali polysilicate and in particular to the pigments. The stabilizer furthermore should for the most part not close off or clog the pores of a plaster layer to be renovated.

During a second inventive step, it was discovered that a stabilizer and/or an emulsifying agent on a silicate base prevents the pigments from insoluble sedimenting and is compatible with the alkali polysilicate of the binder. The stabilizer is formed with small particles on a silicate base, having an average maximum expansion below 3 μm which are distributed colloidal in water because of their charge distribution. So that the particles act as colloids in water and/or remain in a colloidal distribution, they must have charge distributions on their surfaces and the average maximum expansion of the particles must be less than 0.003mm resp. 3 μm. Silicate minerals are comminuted to obtain such small particles. During the comminuting, stabilizer particles are obtained with a spectrum of maximum expansions, wherein essentially a maximum 50% of the particles have expansions exceeding the average maximum expansion. Since the average value is very low, the expansions of the larger particles that are present at relevant shares are still very small, presumably smaller than 6 μm.

Especially preferred is a stabilizer with magnesium aluminum silicate. These inorganic stabilizers are compatible with alkali polysilicate binders and the preferred pigments.

These small stabilizer particles, which are relevant to the invention, have maximum expansions which are substantially smaller than the pore diameters of a plaster layer to be renovated. Standard pore diameters are in the range of approximately 0.2 mm and are thus larger by a factor in the range of 66 than the average maximum expansion of the stabilizer particles. Given these size ratios, we can rule out that the stabilizer particles are arranged such that they form bridges over the pores during the setting.

Following the application of this renovation paint, the desired and in particular the original color again appears distributed uniformly over the complete surface, and the cohesive pores extending through the plaster layer are essentially still open. The sound-attenuating effect of the porous plaster layer is therefore not substantially reduced as a result of the renovation. The matt surface of the porous plaster layer is maintained, even after applying the renovation paint, which would not be the case with paints according to the prior art because these produce a fatty gloss.

When using a preferred pigment, the average size of the pigment particles essentially ranges from 1 to 3 μm and is thus in the same size range as the average diameter for the silicate-based particles of the stabilizer. In a colloidal distribution of the particles in the stabilizer, there are sufficiently large interspaces where the pigment particles are held, so that these particles are also distributed colloidal. Owing to the fact that the pigment particles have sizes in the range of colloids, only a small influence of the stabilizer particles is necessary to hold the pigment particles in the interspaces.

With stabilizers on a silicate base, the silicates form small particles with lattice structures, and ions incorporated into the silicate structures generate different electrical charge distributions along the particles. These charge distributions lead to interactions between partial areas of adjacent particles. The spacing between the individual silicate particles can be kept relatively large in diluted solutions because of the cooperating charge distributions. The value of these silicate particles as stabilizers and rheology generators is based on their colloidal distribution in water. The colloidal structure provides the particles with resistance to structural decomposition. Solids, in particular pigments, are caught in the structure and are isolated and/or held in suspension, which is the case even with low viscosity. The stabilizing of the dispersed pigments is possible even in highly fluid systems where the flowability is important, thus preventing a caking together of suspended pigments. If a partial settling of the pigments occurs, it is restricted by the stabilizer particles, and the pigments can be dispersed once more without problem. The stabilizers on a silicate base do not form irreversible gels in the same way as some organic thickening agents, thus ensuring a suspension with essentially the same viscosity.

A preferred embodiment of a stabilizer on a silicate base is produced from the mineral palygorskite and/or attapulgite which is a phyllosilicate with the chemical composition $(Mg_1Al)_4[OH|(Si,Al)_4O_{10}]_2 \cdot (4+4)H_2O$. The elements magnesium and aluminum and/or silicon and aluminum, listed in the rounded brackets, can respectively replace each other in the formula (substitution or substitutionality), but are always present in the same proportions relative to the other components of the mineral. It crystallizes in the monocline crystal system and forms lucent to non-lucent, for the most part needle-shaped crystals, but also fibrous to massive aggregates with a white, gray to yellow, or gray-green color. In thin layers, it can also be colorless.

Palygorskite belongs to the class of silicates and germanites and there is grouped in the category phyllosilicates. This category, however, is further divided based on the structure of the silicate layers, so that the mineral can be found in the sub-category "simple tetrahedal networks of sixfold rings connected via octahedral networks or bands," depending on its composition, where it only forms a group together with tuperssuatsiaite and yofortierit.

The WO 02/00350 A1 describes the separating and dispersing of attapulgite particles which have the desired anti-setting properties. The needle-shaped crystals have arranged themselves cluster-shaped next to each other during the creation, so that the charge distributions were neutralized. Following the separation of the clusters into individual needle-shaped crystals, these can arrange themselves spaced-apart in water, corresponding to the charge distributions.

According to one preferred embodiment, a stabilizer with palygorskite and/or attapulgite is used which is commercially available under the brand name Acti-Gel 208. In this product, the crystal needles and/or the needle-shaped particles have a length and/or maximum expansion in the range of 1 μm to 2.5 μm, in particular of 1.5 μm to 2.0 μm and a diameter of essentially 30 angstrom resp. 0.003 μm. With these small particles, properties which appear as a result of the particle mass take a back seat to the properties resulting from the large specific surface and thereon occurring charge distributions.

A further optional stabilizer with magnesium aluminum silicate is produced from smektite clay or bentonite. The value of highly pure smektites such as the brand products VEEGUM and VAN GEL, for stabilizers and the rheology is based on their colloidal distribution in water. Each smektite particle is composed of thousands of sub-microscopically small platelets, arranged sandwich style, with water in-between. The surfaces of these platelets carry a negative charge while the sides are slightly positively charged. The negative charge of the platelets for the most part is balanced by sodium ions, but also by small amounts of other inorganic kations. These charge-balancing ions are arranged on the platelet surfaces. Since these ions can be replaced with other kations, they are called "replaceable." Once the smektite has been hydrated (meaning the platelets have been separated), the slightly positively charged platelet sides are attracted by the negatively charged platelet surfaces. The resulting three-dimensional structure, frequently also called 'a house of cards,' forms immediately. The colloidal structure provides the smektite with its useful property, meaning the yield value or the plasticity. This represents a measure of the resistance against structural decomposition. The colloidal structure can absorb pigments at some locations and is thus suitable for stabilizing suspensions.

A further optional stabilizer with stabilizer particles on a silicone base is produced from sepiolith, meaning from a hydrated magnesium silicate which is frequently listed with the following formula in literature

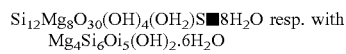
$Si_{12}Mg_8O_{30}(OH)_4(OH_2)S\blacksquare 8H_2O$ resp. with $Mg_4Si_6Oi_5(OH)_2.6H_2O$ and belongs to the group of phyllosilicates. The sepiolith is composed of 2 layers of tetrahedral silica which are connected via oxygen atoms with an oktahedral, unconnected center layer of magnesium atoms. This type of composition provides the sepiolith particles with a microfiber morphology. With the aid of wet-grinding, a product with an average maximum expansion of less than 3 μm can be provided.

The particles of the preferred stabilizer (Acti-Gel 208) are needle-shaped and the preferred pigment particles (IOKAL TYPE 5C) exhibit similar expansions in three orthogonal directions. Owing to the fact that the expansion of the stabilizer particles in the needle axis is similarly high as the average diameter of the pigment particles and because the stabilizer partices have an extremely low expansion in two directions, a single pigment particle essentially has more mass than a stabilizer particle, in particular approximately ten times as much. With the preferred renovation paints, the ratio between the total weight for all stabilizer particles and the total weight of all pigment particles essentially is 0.10. Since the stabilizer particles each have a smaller mass than the pigment particles, the same order of magnitude results for both component particle numbers even with a lower total weight for all stabilizer particles by a factor of 10 as compared to the total weight for all pigment particles. A colloidal distribution of the stabilizer and the pigment particles can therefore be ensured with the preferred stabilizer and the preferred weight ratios between stabilizer and pigment.

The combination of alkali polysilicate binder and the inorganic stabilizer and the inorganic pigment ensures an optimal setting during which the pigment particles are deposited uniformly on the grains in the surface of the plaster layer. During the setting, the gel forming occurs as the first reaction. Owing to the loss of water, the silicate particles are increasingly pressed together by the pigment particles, which are held in place distributed by the inorganic stabilizer particles, until a condensation reactions occurs. The alkali polysilicate binder, the pigments, as well as the stabilizer for the silicate paint and mineral shares of the plaster layer combine to form an insoluble, inorganic matrix.

The above-described bonding to the surfaces of the grains in the plaster layer is aided by the low viscosity of the paint which is ensured by the inorganic binder and the stabilizer on a silicate base. Besides the good total bonding to the plaster layer grains, the fact that the pores in the plaster layer remain open and the undisturbed color effect of the pigments are advantages which can be achieved with the composition of the paint according to the invention.

For an inventive renovation paint, the correct selection of the water share is important for the interaction between the binder, the pigment and the stabilizer. The water share, in particular its ratio to the pigment share, must be selected such that following the application of the renovation paint to a porous plaster layer, the pores are not clogged and the desired, refreshed color appears uniform over the complete surface of the plaster layer. Experiments have shown that the pores remain open and the coloration is uniform if the water share is high and/or if a specified amount of pigment particles is absorbed in a high share of water. For the application, the renovation paint should have a water share of at least 33 weight percentages of the total weight of the paint and, at the same time, the pigment share should be maximally 25 weight percentages of the total weight of the paint, so that the weight ratio between pigment and water is maximally 0.75. The use of more pigments, relative to the amount of water, could cause agglomerations of the extremely small pigment particles which could also close off the considerably larger pore openings of a porous plaster layer.

So that the pigment particles essentially only adhere in the form of a thin coating to the grains of the plaster layer, an airless spraying technique using high pressure, e.g. 150bar, is used in addition to selecting a weight ratio of 0.75 between pigment and water. Experiments have shown that the manual application of a renovation paint with a roller or brush can already result in considerable clogging of the pores if the pigment/water ratio is slightly below the specified limit and/or if the pigment share is very high. With a mechanical application, the pigments can then be compacted in the pore entrances. When using an airless spraying technique, the hitting of the paint and/or the paint flow connected to the spraying causes the pore openings to remain open, and the paint only flows on the surface around the grains in the plaster layer, so that the pigment particles are distributed over the grains.

Thus, the correct selection of the application technique, namely an airless spraying technique, is critical at least when using a high pigment/water weight ratio. It is understood that the airless spraying technique is used at least for the large, cohesive surfaces, wherein these surfaces can also be sprayed twice. A brush can be used for small and specially arranged regions of a plaster layer to be renovated. However, attention should be paid to ensure that only a small amount of paint is applied and/or that the paint it is not compacted in the pore openings.

The preferred weight ratio between pigment and water essentially is at 0.62. At this ratio, a good paint result without interfering pore clogging can be achieved, even with a single application and a second application is possible without a pore clogging that is not acceptable.

If the renovation paint is to be used for porous coatings with small pores, which increases the danger of pore clogging, a renovation paint with a minimum weight ratio between pigment and water of essentially 0.12 can still be used. If the ratio is selected even smaller, the covering capacity of a paint application is too low.

That is to say, with an inventive renovation paint the weight ratio between pigment and water is in the range of 0.12 to 0.75, preferably at essentially 0.62.

A minimum binder share should be used so that a sufficient amount of the applied renovation paint remains on the plaster layer and the pigments bond with the grains of the plaster layer. With ready-to-use binders on an alkali polysilicate base, the alkali polysilicates are already dissolved in water. Thus, the weight of the dissolved alkali polysilicates basically is to be used for the weight of the binder share. With a commercially available alkali polysilicate binder dissolved in water, it follows from the density of 1.4 g/ml that the alkali polysilicates constitute approximately 30% of the weight of the solution. Based on the experiments carried out, it follows that the minimum weight ratio between the alkali polysilicate share of the binder and the water share of the renovation paint essentially amounts to 0.07. Using such a small binder share is useful with a low weight ratio between pigment and water (in the range of 0.12). With a preferred and even with a maximum weight ratio between pigment and water, a weight ratio of essentially 0.29 is used between the alkali polysilicate share of the binder and the water share. The weight ratio between the alkali polysilicate share of the binder and the pigment share is in the range of 0.59 to 0.39, wherein this ratio decreases with an increasing pigment share and, according to one preferred embodiment, essentially is at 0.47. That is to say, the weight of the added alkali polysilicates in the binder roughly ranges from ⅔ to ⅓ of the pigment weight and is at approximately ½ for the preferred embodiment.

So that the pigments of the renovation paint are sufficiently stabilized therein and/or do not sediment while sticking together, a minimum share of the stabilizer must be used. With ready-to-use stabilizers on a silicate base, preferably with magnesium aluminum silicate, the silicate is already emulsified in the water and advantageously comprises the powdered product Acti-Gel 208, wherein the stabilizer weight consists of 30% Acti-Gel 208 and 70% water. For the stabilizer share used, we essentially use the weight of the stabilizer silicate, preferably the magnesium aluminum silicate. The experiments carried out have shown that the weight ratio between the silicate share of the stabilizer and the pigment share of the renovation paint is essentially 0.10. Thus, a stabilizer silicate share weight corresponding of approximately 10% of the pigment weight must be used.

To achieve specific effects, corresponding additives are added, if applicable, to the renovation paint.

If the goal is to improve the fire protection with a synthetic resin binder during the renovation of a porous coating, then aluminum hydroxide and in particular the brand product APYRAL 24 can be added as the additive.

If the specific goal is to improve the color quality during the renovation of a porous coating, an additive for a non-glossy brightening effect can be added besides the above-described pigments, for example a sodium aluminum-silicate powder, especially the brand product Zeolex 330.

The following ranges are obtained for the individual components in the total weight of the renovation paint:

| | |
|---|---|
| water | 33% to 70% |
| alkali polysilicates of the binder | 5% to 10% |
| silicate of the stabilizer | 0.9 to 2.7% |
| pigment | 9% to 25% |
| aluminum hydroxide powder | 0% to 2% |
| sodium aluminum silicate | 0% to 5% |

The quality of the deposition of pigment particles and silicate stabilizer particles on the grains in the surface of the plaster layer depends on the partial paint volumes contributed by the respective particles and on the volume contributed by the alkali polysilicates of the binder. A good deposition is achieved if the visible surfaces of the grains are substantially covered by pigment particles. The covering is sufficient if it removes the negative appearance of dirt on the grains. The ideal covering consists of partial layers of pigment particles being in contact to next neighbors and covering a high percentage of visible grain surfaces of the plaster layer. Thus for a good covering of a grain a certain number of pigment particles with a given size respectively particle volume have to be spread over the grain surface. Therefore a number of the pigment particles times an average volume of a single pigment particle is giving a pigment particle volume needed for sufficiently covering a grain. The silicate stabilizer particles and the alkali polysilicates of the binder ensure an even distribution and setting of pigment particles and have to be present in given numbers respectively in corresponding partial volumes.

The above described formulations or limitations of the renovation paint are listing the components in percents of the total weight. More detailed limitations for a renovation paint with preferred covering qualities will be defined by using volumes of the listed components. A dimensionless pigment volume concentration (PVC) is defined as a ratio between the sum of partial volumes of all pigment particles $V_P$ and all stabilizer particles $V_S$ and the sum of partial volumes of all pigment particles $V_P$, all stabilizer particles $V_S$ and the alcali polysilicates of the binder $V_B$:

$$PVC = \frac{V_P + V_S}{V_P + V_S + V_B}$$

The quality of a preferred renovation paint is not only depending on a good covering of grains by pigment particles but also by keeping open the pores in the plaster layer. Therefore a further limitation has to make sure that there is no excess volume of pigment particles which could fill up the pores. Clogging pores of the plaster layer could occur if small pigment particles would clot to elements with diameters in the range of pore diameters. Such a clotting of pigment particles can be prevented by sufficient water at each pigment particle. The amount of water needed has to be above the water which can be absorbed by the respective pigment. The water absorption coefficient $W_A$ is a characterizing parameter for pigments, where it indicates the ratio between the weight of water absorbed by 100 g dry pigment material and 100 g.

A limitation for keeping open the pores in the plaster layer is using a Critical Pigment Volume Concentration (CPVC) in the following form $$CPVC = \frac{1}{1 + \frac{\rho_P \times W_A}{\rho_W}}$$

where $W_A$: water absorption coefficient of the pigment particles
$\rho_P$: density of pigment particles
$\rho_W$: water density This Critical Pigment Volume Concentration is an upper boundary for the criteria of open pores.

A Q-value is introduced in order to characterize both the quality of the deposition of the pigment particles on the grains and keeping open the pores of the plaster layer. This Q-value is defined as the ratio between the above introduced Pigment Volume Concentration (PVC) and the Critical Pigment Volume Concentration (CPVC).

$$Q = \frac{PVC}{CPVC} \times 100\%$$

Tests showed good results in terms of covering the visible surfaces of the plaster grains with pigment particles and keeping open the pores of the plaster layer for Q values in the range of 60% to 120%. Further preferred embodiments have Q values in the ranges of 60% to 100% and 60% to 80%.

Restoration paints with q-values in the above mentioned preferred ranges show a good spreading and bonding of pigment particles on dirty surfaces of the grains in the plaster layer aided by the low viscosity of the paint which is ensured by the inorganic binder and the stabilizer on a silicate base. The good color effect of bonded pigment particles is combined with the fact that the pores in the plaster layer remain open.

The invention claimed is:

1. A paint for renovating an open-pored plaster layer, the paint comprising:
water;
an alkali polysilicate binder comprising at least one alkali metal selected from the group consisting of lithium, sodium, potassium, rubidium, cesium and francium;
a pigment comprising particles; and
stabilizer particles comprising silicate, wherein the stabilizer particles have (i) an electrical charge distribution on their surface, and (ii) a colloidal distribution in the water;
wherein the paint allows pores in the open-pored plaster layer to remain substantially open when the paint is applied to the open-pored plaster layer.

2. The paint according to claim 1, wherein the stabilizer particles-comprise magnesium aluminum silicate.

3. The paint according to claim 2, wherein the stabilizer particles further comprise needle-shaped particles produced from at least one of mineral palygorskite and attapulgite.

4. The paint according to claim 1, wherein an average size of the pigment particles is smaller than 30 µm.

5. The paint according to claim 4, wherein the pigment comprises inorganic pigment particles.

6. The paint according to claim 5, wherein the pigment comprises naturally fine-grained micro-crystalline $CaCO_3$ with an average grain size of essentially 2 µm, wherein 99.99 weight percent of the pigment particles have a maximum diameter below 40 µm and wherein 90 weight percent of the pigment particles have a maximum diameter below 5 µm.

7. The paint according to claim 1, wherein the alkali polysilicate binder comprises at least one of sodium silicate and potassium silicate with lithium silicate.

8. The paint according to claim 1, wherein the water is present as at least 33 weight percent of the total weight of the paint and wherein the pigment is present at a maximum of 25 weight percent of the total weight of the paint, wherein the weight ratio of the pigment to the water is at a maximum of 0.75.

9. The paint according to claim 1, wherein a weight ratio between the alkali polysilicate binder and the water of the paint is at least 0.07, and wherein a weight ratio between the alkali polysilicate binder and the pigment is in the range of 0.59 to 0.39.

10. The paint according to claim 1, wherein the weight ratio of the stabilizer particles to the pigment is essentially 0.10.

11. The paint according to claim 1, wherein the weight shares relative to the total weight of the paint are in the following ranges:

| water | 33% to 70% |
| alkali polysilicates of the binder | 5% to 10% |
| stabilizer particles | 09% to 2.7% |
| pigment | 9% to 25%. |

12. The paint according to claim 1, wherein the paint further comprises additives with weight shares of the total weight of the paint in the following ranges:

| aluminum hydroxide powder | 0% to 2% |
| sodium aluminum silicate | 0% to 5%. |

13. A method for renovating an open-pored plaster layer, comprising:
applying the paint according to claim 1 with an airless spraying technique under high pressure.

14. The paint according to claim 1, wherein the paint has a Q-value in the range of 60% to 120%, wherein:

$$Q = \frac{PVC}{CPVC} \times 100\%$$

where:

$$PVC = \frac{V_P + V_S}{V_P + V_S + V_B}$$

$V_P$: volume of all pigment particles
$V_S$: volume of all stabilizer particles
$V_B$: volume of the alkali polysilicate binder $$CPVC = \frac{1}{1 + \frac{\rho_P \times W_A}{\rho_W}}$$

$W_A$: water absorption coefficient of the pigment particles
$\rho_P$: density of the pigment particles
$\rho_W$: water density.

15. The paint according to claim 14, wherein the Q-value is in the range of 60% to 100%.

16. The paint according to claim 14, wherein the Q-value is in the range of 60% to 80%.

17. The paint according to claim 3, wherein the needle-shaped particles have lengths in the range of 1 to 2.5 µm.

18. The paint according to claim 17, wherein the needle-shaped particles have a diameter of essentially 30 angstrom.

19. The paint according to claim 4, wherein an average size of the pigment particles is smaller than 6 µm.

20. The method according to claim 13, wherein the paint is applied with an airless spraying technique under 150 bar.

* * * * *